(12) United States Patent
Mandato et al.

(10) Patent No.: US 11,895,171 B2
(45) Date of Patent: Feb. 6, 2024

(54) METHOD AND APPARATUS FOR MOBILE DEVICE AS TEMPORARY CONTENT ORIGIN

(71) Applicant: Comcast Cable Communications, LLC, Philadelphia, PA (US)

(72) Inventors: Nicholas Mandato, Georgetown, CO (US); John Bieberly, Littleton, CO (US); Jonathan Kirkovich, Parker, CO (US); James Rupert, Yakima, WA (US); Christopher Weaver, Littleton, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/492,249

(22) Filed: Oct. 1, 2021

(65) Prior Publication Data

US 2023/0107720 A1    Apr. 6, 2023

(51) Int. Cl.
*H04L 65/65* (2022.01)
*H04N 21/845* (2011.01)
*H04N 21/6373* (2011.01)
*H04N 21/6408* (2011.01)
*H04N 21/643* (2011.01)

(52) U.S. Cl.
CPC ......... *H04L 65/65* (2022.05); *H04N 21/6373* (2013.01); *H04N 21/6408* (2013.01); *H04N 21/64322* (2013.01); *H04N 21/845* (2013.01)

(58) Field of Classification Search
CPC ... H04L 65/65; H04L 65/4084; H04L 67/104; H04N 21/6373; H04N 21/6408; H04N 21/64322; H04N 21/845; H04N 21/83
See application file for complete search history.

(56) References Cited

U.S. PATENT DOCUMENTS

| 8,010,984 B2 | 8/2011 | Thukral |
| 8,396,466 B2 | 3/2013 | Sharma et al. |
| 8,683,007 B2 | 3/2014 | Kashef et al. |
| 8,750,677 B2 | 6/2014 | Brown et al. |

(Continued)

FOREIGN PATENT DOCUMENTS

| CN | 103188524 A | 7/2013 | |
| GB | 2534057 A * | 7/2016 | ............. H04L 47/25 |

(Continued)

*Primary Examiner* — Caroline H Jahnige
(74) *Attorney, Agent, or Firm* — BakerHostetler

(57) ABSTRACT

Methods and systems are described for content delivery. A user of a first computing device that is playing back content may want to transfer or cast the content to a second computing device. When the first computing device receives the request to cast the content to the second computing device, the content may continue to be received and played back by the first computing device while it establishes a seamless transition to the second computing device. The first computing device may contact the content origin and send to the second computing device a manifest file that instructs the second computing device to request an initial portion of the segments of the content from the first computing device. The content origin may then process the cast request from the first computing device and begin providing subsequent segments of content to the second computing device.

20 Claims, 8 Drawing Sheets

(56) References Cited

U.S. PATENT DOCUMENTS

| | | |
|---|---|---|
| 8,799,496 B2 | 8/2014 | Phillips et al. |
| 8,954,596 B2 | 2/2015 | Ronca et al. |
| 9,037,683 B1 | 5/2015 | Yoden |
| 9,055,194 B2 | 6/2015 | Cho et al. |
| 9,537,902 B2 | 1/2017 | Barone et al. |
| 9,594,482 B2 | 3/2017 | Pontual et al. |
| 9,632,588 B1 | 4/2017 | Patoskie |
| 9,648,073 B2 | 5/2017 | Kafle et al. |
| 9,662,572 B1 | 5/2017 | Supratim |
| 9,747,011 B2 | 8/2017 | Lewis et al. |
| 9,749,373 B2 * | 8/2017 | Dave ................. H04L 65/80 |
| 9,769,513 B2 | 9/2017 | Hasek |
| 9,832,246 B2 | 11/2017 | Lajoie et al. |
| 9,854,284 B2 | 12/2017 | Francisco |
| 10,091,264 B2 | 10/2018 | Veeramani et al. |
| 10,291,672 B2 | 5/2019 | Jamal-Syed et al. |
| 10,554,710 B2 | 2/2020 | Cho et al. |
| 10,582,230 B2 | 3/2020 | Swan et al. |
| 2005/0254524 A1 | 11/2005 | An |
| 2008/0022006 A1 | 1/2008 | van Oldenborgh et al. |
| 2008/0140853 A1 | 6/2008 | Harrison |
| 2010/0161813 A1 | 6/2010 | Avasarala |
| 2010/0169505 A1 | 7/2010 | Noguchi et al. |
| 2013/0125014 A1 | 5/2013 | Sharif-Ahmadi et al. |
| 2013/0191757 A1 | 7/2013 | Smith et al. |
| 2013/0219072 A1 | 8/2013 | Han et al. |
| 2015/0286369 A1 | 10/2015 | Pontual et al. |
| 2015/0350690 A1 | 12/2015 | Zerr et al. |
| 2016/0234274 A1 * | 8/2016 | Kretz ................. H04L 67/06 |
| 2017/0094345 A1 | 3/2017 | Zerr et al. |
| 2017/0104550 A1 | 4/2017 | Rajapakse et al. |
| 2017/0104816 A1 | 4/2017 | Yan |
| 2017/0118500 A1 * | 4/2017 | Carroll ............. H04N 21/26258 |
| 2018/0067934 A1 * | 3/2018 | Chen ................. G06F 16/43 |
| 2019/0320219 A1 * | 10/2019 | Yoden ............. H04N 21/43615 |
| 2020/0050346 A1 * | 2/2020 | Lewis ................. G06F 16/487 |
| 2020/0151759 A1 | 5/2020 | Chai et al. |

FOREIGN PATENT DOCUMENTS

| | | |
|---|---|---|
| WO | 2011/091296 A1 | 7/2011 |
| WO | 2011/154818 A2 | 12/2011 |
| WO | 2012/116465 A1 | 9/2012 |
| WO | 2015/179688 A1 | 11/2015 |
| WO | 2015/180102 A1 | 12/2015 |
| WO | 2016/008974 A1 | 1/2016 |
| WO | 2021/009597 A1 | 1/2021 |

* cited by examiner

METHOD AND APPARATUS FOR MOBILE DEVICE AS TEMPORARY CONTENT ORIGIN

BACKGROUND

The use of services for streaming content on mobile devices such as smartphones, tablets, and laptops is increasingly common. Users often access these services on their mobile phone to initiate playback movies or television programming but then want to switch playback of the content to another display device (e.g., to cast to another receiver) as these same services may also be accessible on their computer, monitor, television via a set-top box or other device, or other display device.

However, such transitions to a cast receiver often result in playback gaps or other disruptions that degrade the user experience. Accordingly, there is a need for improved techniques for transitioning or casting the playback of content.

SUMMARY

This Summary is provided to introduce concepts that are further described herein. This Summary is not intended to be used to limit the scope of the claimed subject matter.

Methods and systems are described for content delivery. A user of a first computing device, such as a mobile device or tablet, that is playing back content may want to transfer or cast the content to a second computing device with a larger display such as a television or set top box connected to a display device. When the first computing device receives the request to cast the content to the second computing device, the content may continue to be received and played back by the first computing device while it establishes a seamless transition to the second computing device. The first computing device may contact the content origin and send to the second computing device a manifest file that instructs the second computing device to request an initial portion of the segments of the content from the first computing device. For example, the manifest may comprise the Internet Protocol (IP) address of the first computing device to identify the first computing device as the source in the manifest. Alternatively, the manifest may be provided by the content origin. The content origin may then process the cast request from the first computing device and begin providing subsequent segments of content to the second computing device.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings.

DETAILED DESCRIPTION OF ILLUSTRATIVE EMBODIMENTS

Methods and systems are described for content delivery. In accordance with the embodiments described herein, devices in a system may seamlessly transfer the playback of content to a second device, such as a larger display such as a television or set top box connected to a display device. The techniques disclosed herein minimize any disruption or gap in playback experienced by the user.

Figure 1:
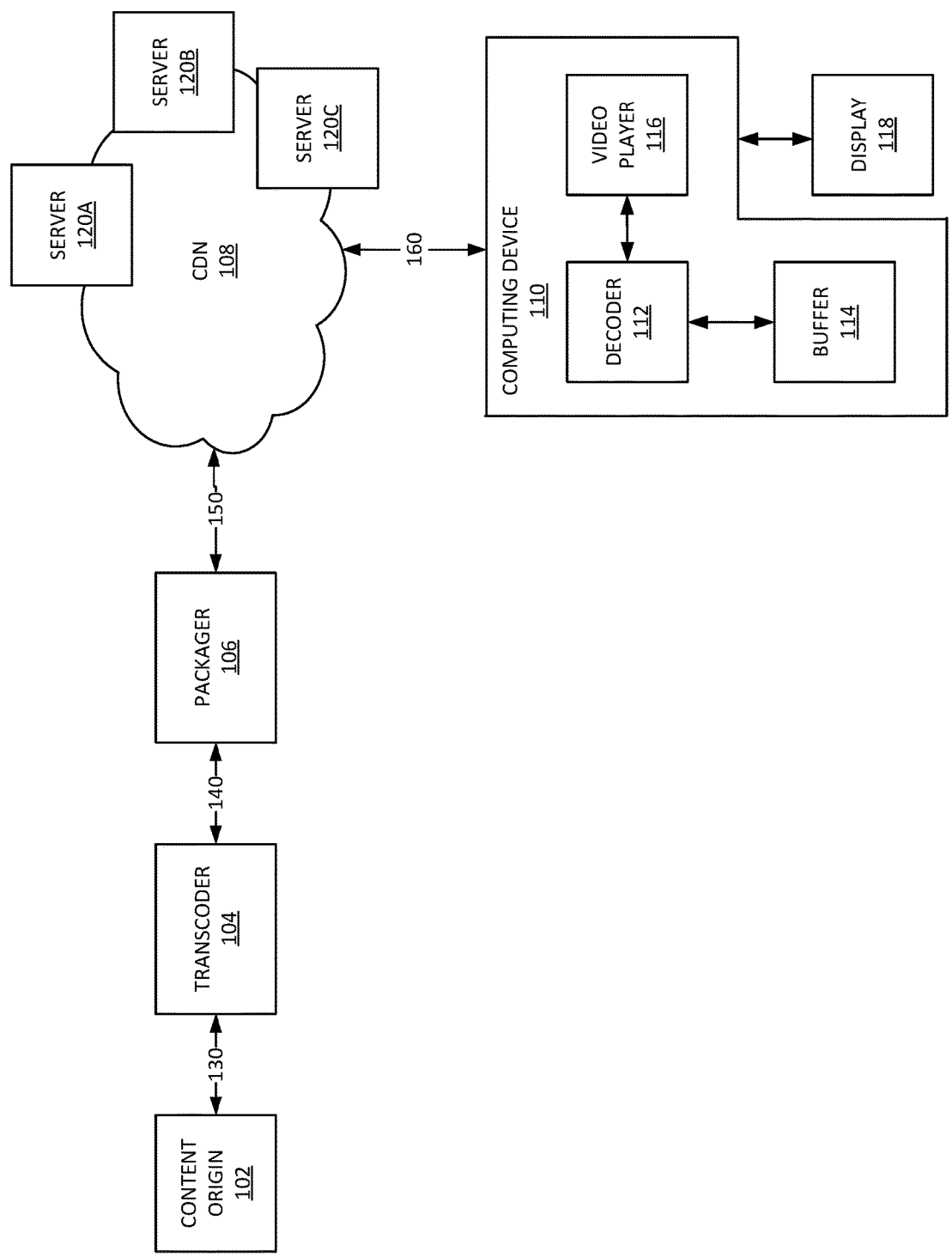
FIG. 1 shows an example system.

FIG. 1 shows an example system 100. The system 100 may comprise a content origin 102, transcoder 104, packager 106, a content delivery network (CDN) 108, and a computing device 110. The techniques for video processing described herein are applicable to any delivery method including but not limited to Dynamic Adaptive Streaming over HTTP (DASH), HTTP Live Streaming (HLS), the QAM digital television standard, and adaptive bitrate (ABR) streaming.

The computing device 110 may comprise a television, a monitor, a laptop, a desktop computer, a smartphone, a set-top box, a cable modem, a gateway, a tablet, a wearable computing device, a mobile computing device, any computing device configured to receive and/or render content, the like, and/or any combination of the foregoing. The computing device 110 may comprise a decoder 112, a buffer 114, and a video player 116. The computing device 110 (e.g., the video player 116) may be communicatively connected to a display 118. The display 118 may be a separate and discrete component from the computing device 110, such as a television display connected to a set-top box. The display 118 may be integrated with the computing device 110. The decoder 112, the video player 116, the buffer 114, and the display 118 may be realized in a single device, such as a laptop or mobile device. The decoder 112 may decompress/decode encoded video data. The encoded video data may be received from the transcoder 104, the packager 106, or the CDN 108.

The content origin 102 may comprise a source feed of content from a provider. For example, the content origin 102 may comprise a broadcast source, a headend, a video on-demand server, a cable modem termination system, the like, and/or any combination of the foregoing. The content origin 102 may send content 130 to the transcoder 104. The content 130 may comprise video frames or other images. For example, the content 130 may comprise video frames in a Moving Picture Experts Group (MPEG) Single Program Transport Stream (MPEG-SPTS). Video frames may comprise pixels. A pixel may comprise a smallest controllable element of a video frame. A video frame may comprise bits for controlling each associated pixel. A portion of the bits for an associated pixel may control a luma value (e.g., light intensity) of each associated pixel. A portion of the bits for an associated pixel may control one or more chrominance value (e.g., color) of the pixel. The content origin 102 may receive requests for the content 130 from the transcoder 104, the packager 106, the computing device 110, or the CDN 108.

The content origin 102 may send content 130 to the transcoder 104 based on a request for video from the transcoder 104, the packager 106, the computing device 110, or the CDN 108. The content 130 may comprise uncompressed video data or a content stream such as an MPEG-SPTS. The transcoder 104 may transcode the content 130 into one or more output streams 140. The one or more output streams 140 may comprise video encoded with a different resolution and/or a different bitrate. The one or more output streams 140 may comprise a presentation timestamp (PTS) to synchronize the content. The one or more output streams 140 may comprise one or more Instantaneous Decoder Refresh (IDR) frames.

The transcoder 104 may comprise an encoder, which may encode uncompressed video data received from the content origin 102. When uncompressed video data is received, the encoder may encode the video (e.g., into a compressed format) using a compression technique prior to transmission. The content origin 102 and the transcoder 104 may be co-located at a premises, located at separate premises, or associated with separate instances in the cloud.

The packager 106 may receive the one or more output streams 140 from the transcoder 104. The packager 106 may generate one or more ABR streams 150 in different ABR streaming formats. The one or more ABR streams 150 may comprise segments or fragments of video and a manifest. The manifest may indicate availability of the ABR stream and segments/fragments and information for requesting the segments/fragments (e.g., via a Uniform Resource Locator (URL)). The packager 106 may send the one or more ABR streams 150 to the CDN 108.

The CDN 108 may comprise one or more computing devices such as servers 120A, 120B, 120C that store the one or more ABR streams 150. The CDN 108 may receive a request for content from the computing device 110. The request may be sent via a transfer protocol such as a transfer protocol used for over-the-top (OTT) playout applications. For example, this protocol may be HTTP as used in the examples described herein. However, any other transfer protocol may be used. The CDN 108 may authorize/authenticate the request and/or the computing device 110 from which the request originated. The request for content may comprise a request for a channel, a video on-demand asset, a website address, a video asset associated with a streaming service, the like, and/or any combination of the foregoing. The CDN 108 may send the request to the content origin 102, the transcoder 104, or the packager 106. The CDN 108 may send the requested content 160 to the computing device 110. The one or more servers 120A, 120B, 120C of the CDN 108 may serve the content 160 to the computing device 110.

Figure 2:
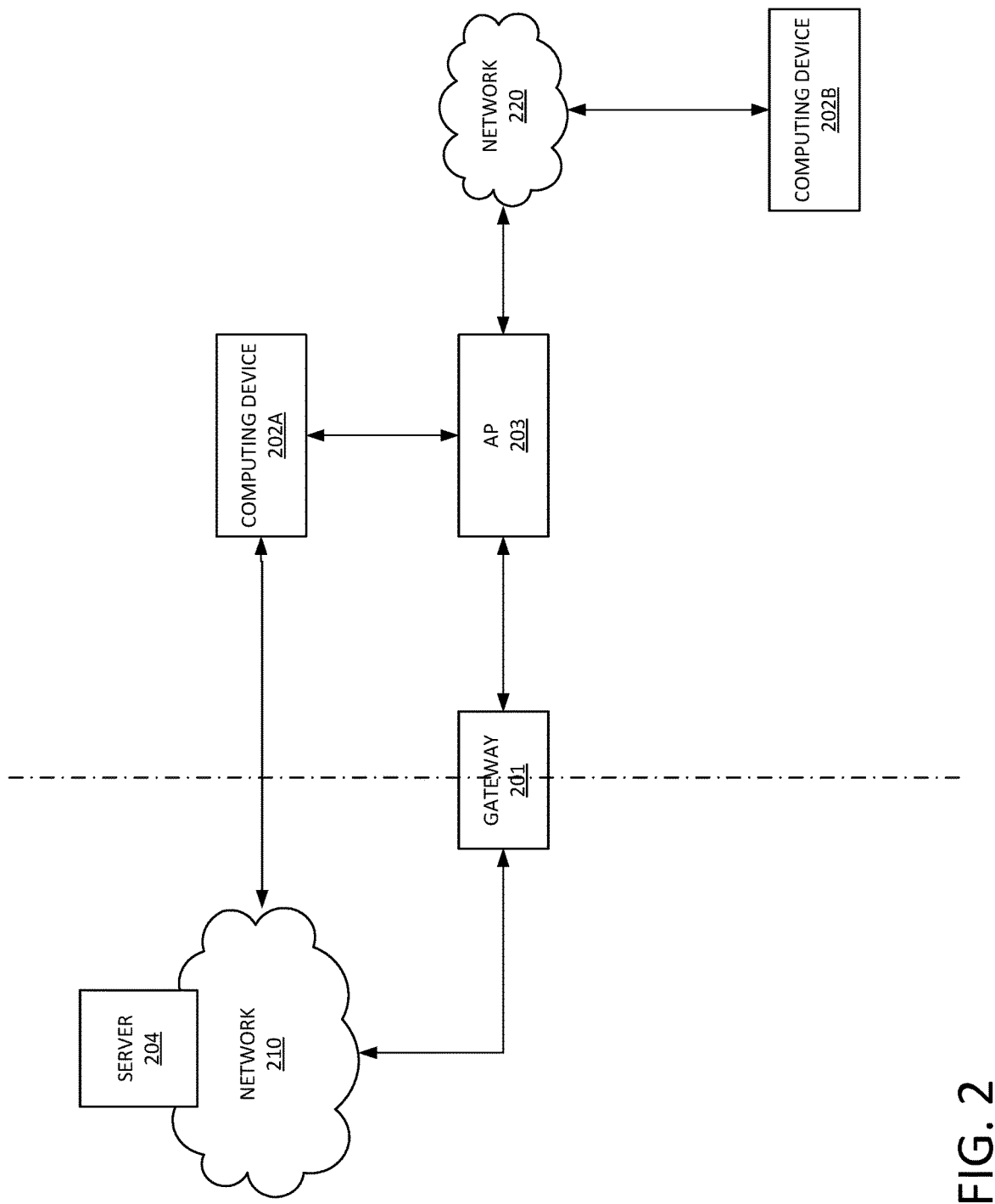
FIG. 2 shows an example system.

FIG. 2 shows an example system 200. A computing device 202a may comprise a smartphone, a tablet, a wearable computing device, a mobile computing device, any computing device configured to receive and/or render content, the like, and/or any combination of the foregoing. A computing device 202b may comprise a television, a monitor, a laptop, a desktop computer, a set-top box, any computing device configured to receive and/or render content, the like, and/or any combination of the foregoing. The computing devices 202a and 202b may comprise transmitters, receivers, and/or transceivers for communicating via a network 220 and/or a network 210. The server 204 may be associated with a content origin providing a source feed of content from a provider.

The system 200 may comprise a gateway 201. The gateway 201 may send signals via the network 210. The network 210 may comprise a network such as the Internet or any other network described herein. The gateway 201 may operate as a wireless local area network (WLAN) router and cable modem. An access point (AP) 203 may send signals, to the computing devices 202a and 202b, via the network 220. The AP 203 may receive signals, from the computing devices 202a and 202b, via the network 220. The AP 203 may communicate with the gateway 201 to provide Wi-Fi communications via network 220. The gateway 201 and AP 203 may be part of the same device and are depicted separately in FIG. 2 as an example. The AP 203 may comprise one or more radios each comprising transmitters, receivers, and/or transceivers for communicating via the network 220. The network 220 may comprise a Wi-Fi network. The network 220 may communicate using technologies such as WLAN technology based on the Institute of Electrical and Electronics Engineers (IEEE) 802.11 standards or any other appropriate technologies.

A user playing back content such as video content on the computing device 202a may want to transition the playback of content to the computing device 202b. For example, the user may want to use Google Cast/Apple Airplay functionality to cast or transition to the computing device 202b (e.g., use the computing device 202b as a cast receiver) and use the computing device 202b as a primary display for the content. The term, cast, as used herein may refer to sending/transferring/transitioning the playback of content from a first device to a second device, such as to a larger display such as a television or set top box connected to a display device. For example, the user may initiate casting via the user interface of the computing device 202a. The content may stop playing on the computing device 202a, and the computing device 202b (the cast receiver) may start a local app to play back the content. The computing device 202b may receive the content from the content origin via server 204.

Figure 3:
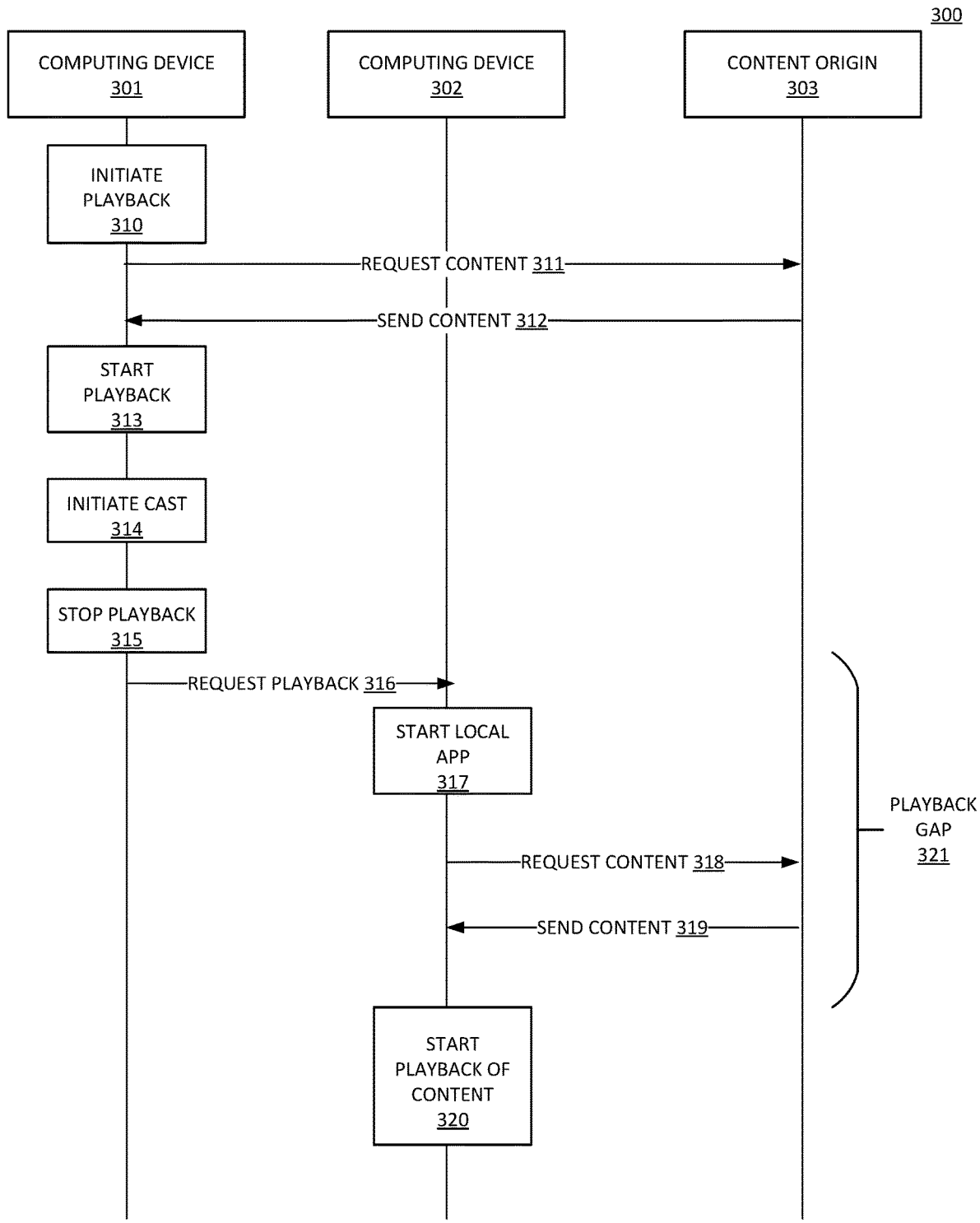
FIG. 3 shows an example method.

FIG. 3 shows an example method 300. At step 310, computing device 301 may initiate playback of content. For example, computing device 301 may comprise a smartphone, a tablet, a wearable computing device, a mobile computing device, and the user may initiate playback of a video on the computing device 301. At step 311, the computing device 301 may send a request for content to the content origin 303. The content origin 303 may comprise a server such as a server in a CDN that stores one or more ABR streams of the content. At step 312, the content origin 303 may send the content to the computing device 301, and the computing device may start playback of the content (step 313).

During playback of the content, the user may want to transition the playback of content to the computing device 302. For example, the computing device 302 may comprise a television, a monitor, a laptop, a desktop computer, or a set-top box. The user may want to use Google Cast/Apple Airplay functionality to cast or transition to the computing device 302 (e.g., use the computing device 302 as a cast receiver) and use the computing device 302 as a primary display for the content. At step 314, the user may initiate casting by sending a request via the user interface of the computing device 301. At step 315, the content may stop playing on the computing device 301. At step 316, the computing device 301 may send a request for playback of the content to computing device 302. At step 317, the computing device 302 may start a local app to play back the content and send a request for the content to the content origin 303 (step 318). At step 319, the computing device 302 may receive the content from the content origin 303. At step 320, the computing device 302 may start playback of the content.

In this example, during the transition of playback from the computing device 301 to the computing device 302 (steps 315-319), there may be a delay that is significant enough to be noticeable to the user until the content resumes playing on the computing device 302 (step 320). The techniques disclosed herein minimize this delay to provide a more seamless transition to cast receivers.

Figure 4:
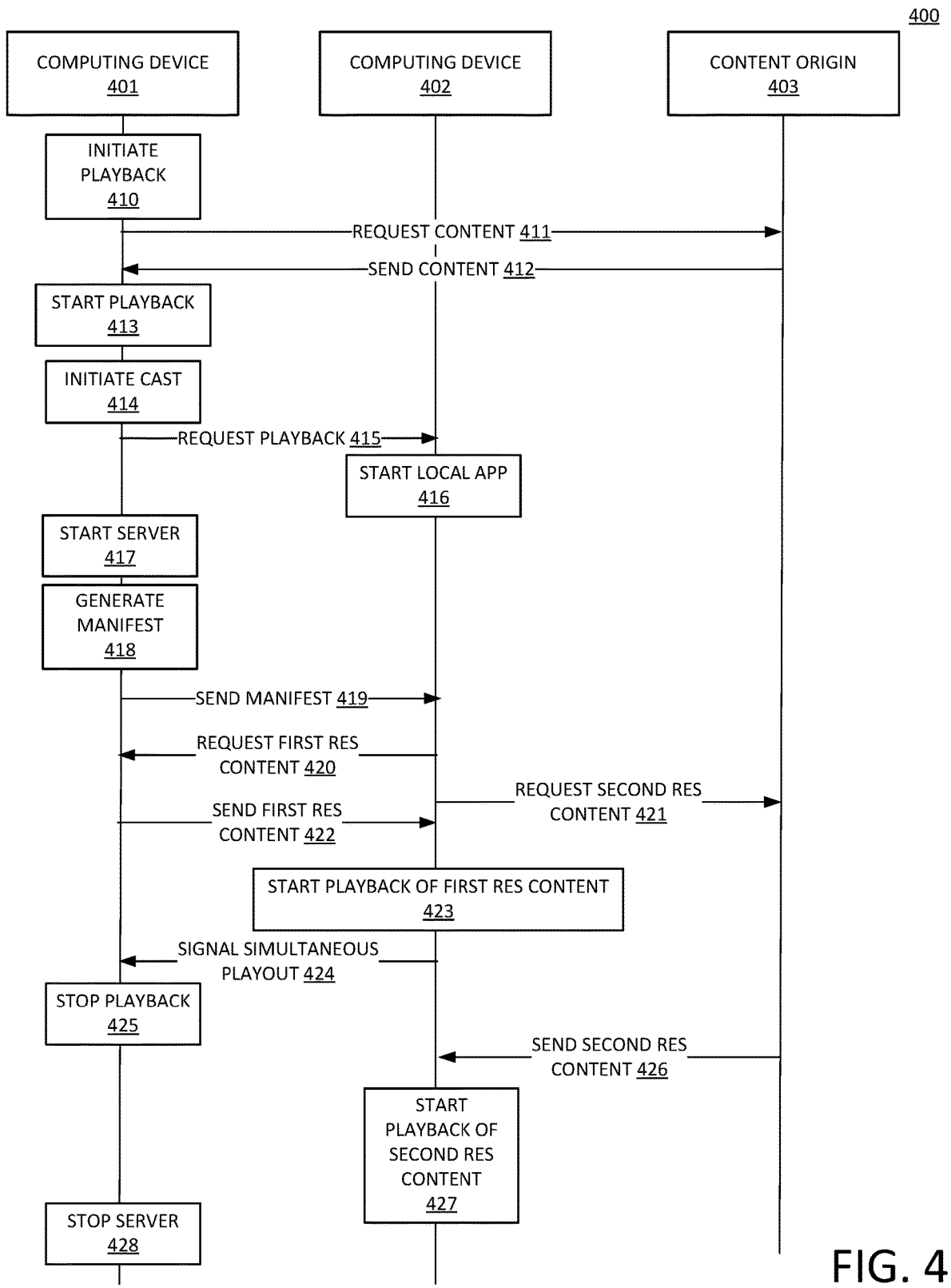
FIG. 4 shows an example method.

FIG. 4 shows an example method 400. At step 410, computing device 401 may initiate playback of content. For example, computing device 401 may comprise a smartphone, a tablet, a wearable computing device, a mobile computing device, and the user may initiate playback of a video on the computing device 401. At step 411, the computing device 401 may send a request for content to the content origin 403. The content origin 403 may comprise a server such as a server in a CDN that stores one or more ABR streams of the content. At step 412, the content origin 403 may send the content to the computing device 401, and the computing device may start playback of the content (step 413).

During playback of the content, the user may want to transition the playback of content to the computing device 402. For example, the computing device 402 may comprise a television, a monitor, a laptop, a desktop computer, or a set-top box. The user may want to use Google Cast/Apple Airplay functionality to cast or transition to the computing device 402 (e.g., use the computing device 402 as a cast receiver) and use the computing device 402 as a primary display for the content. At step 414, the user may initiate casting by sending a request via the user interface of the computing device 401.

At step 415, the computing device 401 may send a request for playback of the content to computing device 402. At step 416, the computing device 402 may start a local app to play back the content. At step 417, the computing device 401 may operate as a web server that accepts requests from the computing device 402 via a transfer protocol (e.g., HTTP or any other transfer protocol for OTT playout applications) and can stream content segments to the computing device 402. Operating as a web server may comprise, for example, executing software that accepts requests via HTTP (or any other transfer protocol) to distribute content. Accordingly, the computing device 401 may serve as a temporary origin for serving content segments to computing device 402. These content segments, for example, may have already been downloaded to the computing device 401. Using the computing device 401 as a temporary origin for serving content segments to the computing device 402 reduces the amount of time to begin playback on the computing device 402 (e.g., the cast receiver in this example). At step 418, the computing device 401 may generate a manifest indicating the availability of the segments and information usable by the computing device 402 for requesting the segments. For example, the information may comprise the IP address of the computing device 401 and/or URLs for requesting the segments. At step 419, the computing device 401 may send the manifest to the computing device 402. Alternatively, the content origin 403 may generate the manifest and send it to the computing device 402. The computing device 402 may request segments from the computing device 401 based on the information in the manifest.

At step 420, the computing device 402 may send a request for the content to the to the computing device 401. The request for content may be a request for content encoded at a first resolution. For example, since the computing device 401 is serving the content, the request may comprise a request for content encoded at a lower resolution version of the content than the computing device 401 was playing back. At step 421, the computing device 402 may send a request for the content to the content origin 403. The request for the content may be a request for content encoded at a second resolution. For example, the request for the content that is sent to the content origin 403 may comprise a request for a higher resolution version of the content than the content served by computing device 401.

At step 422, the computing device 401 may send the requested content to the computing device 402. For example, the computing device 401 may send the requested low resolution version of the content to the computing device 402. At step 423, the computing device 402 may start playing back the requested content. For example, the computing device 402 may start playing back the requested low resolution version of the content. At step 425, the computing device 402 may send a signal of simultaneous playout 424 to computing device 401 to indicate that the computing device 402 is playing back the content that is also being played back on the computing device 401. At step 425, the computing device 401 may stop playback of the content. Having the computing device 401 continue to playback content until the computing device 402 (e.g., the cast receiver in this example) plays back the content eliminates the playback gap shown in the example of FIG. 3. Accordingly, the order in which playback on the computing device 401 is stopped and playback on the computing device 402 is started has been changed as compared to the example in FIG. 3, which may result in minimal disruption and an improved user experience.

At step 426, the computing device 402 may receive the requested content from the content origin 403. For example, the computing device 402 may receive the requested content encoded at the second resolution. For example, the second resolution version may be a higher resolution version of the content than the content served by computing device 401. At step 427, the computing device 402 may start playback of the content received from the content origin 403. For example, the computing device 402 may start playing back the requested content encoded at the second resolution. For example, the computing device 402 may start playing back the requested higher resolution version of the content. At step 428, the computing device 401 may stop the web server.

Figure 5:
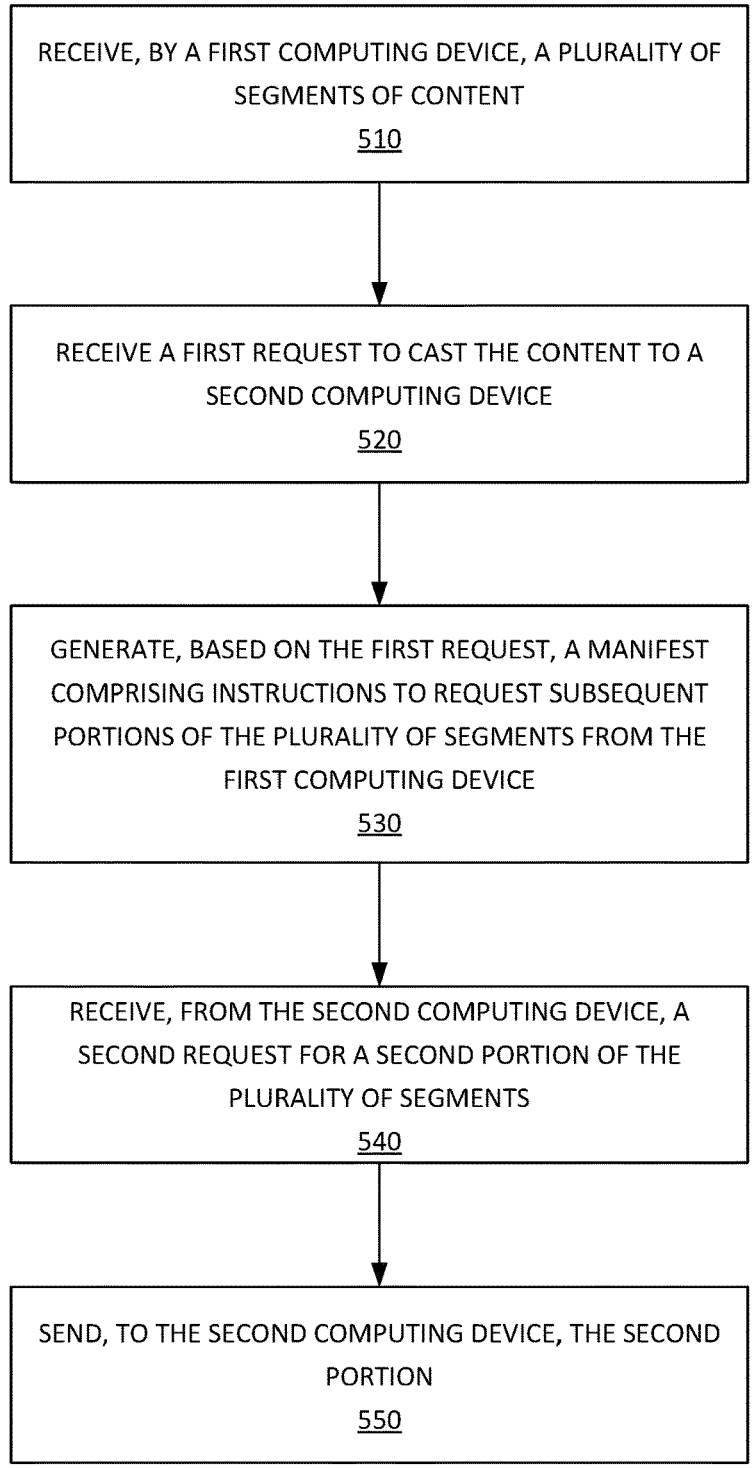
FIG. 5 shows an example method.

FIG. 5 shows an example method 500. The method 500 of FIG. 5, may be performed by any device, for example, by any of the devices depicted in FIGS. 1-4 or described herein. While each step in the method 500 of FIG. 5 is shown and described separately, multiple steps may be executed in a different order than what is shown, in parallel with each other, or concurrently with each other. At step 510, a plurality of segments of content may be received by a first computing device. The first computing device may comprise a smartphone, a tablet, a wearable computing device, or a mobile computing device. The first request may be received via a user input.

At step 520, a first request to cast the content to a second computing device may be received. The first request may be received during playback via the first computing device of a first portion of the plurality of segments of content. The second computing device may comprise a television, a monitor, a laptop, a desktop computer, or a set-top box.

At step 530, a manifest comprising instructions to request subsequent portions of the plurality of segments from the first computing device may be generated based on the first request. The manifest may comprise the IP address of the first computing device indicating that the first computing device is a source of the second portion. At step 540, the manifest may be sent to the second computing device based on the first request to cast the content to the second computing device.

At step 540, a second request for a second portion of the plurality of segments may be received from the second computing device. The second request for the second portion may indicate a request for low resolution content. The second request may be based on the first request and the manifest. The first computing device may send an indication that the content is being casted to the second computing device to the content origin to cause the content origin to send a second plurality of segments of content to the second computing device once the first plurality of segments of content have been played back. The second plurality of content segments may comprise high resolution content.

At step 550, the second portion may be sent to the second computing device. Sending the second portion may comprise running a web server that accepts requests for the second portion from the second computing device via a transfer protocol such as a transfer protocol used for OTT playout applications. For example, this protocol may be HTTP, or any other transfer protocol may be used. The first computing device may receive an indication from the second computing device and based on the sending the second portion that the second computing device started playback of the second portion. The first computing device may discontinue playback via the first computing device of the first portion based on the indication.

Figure 6:
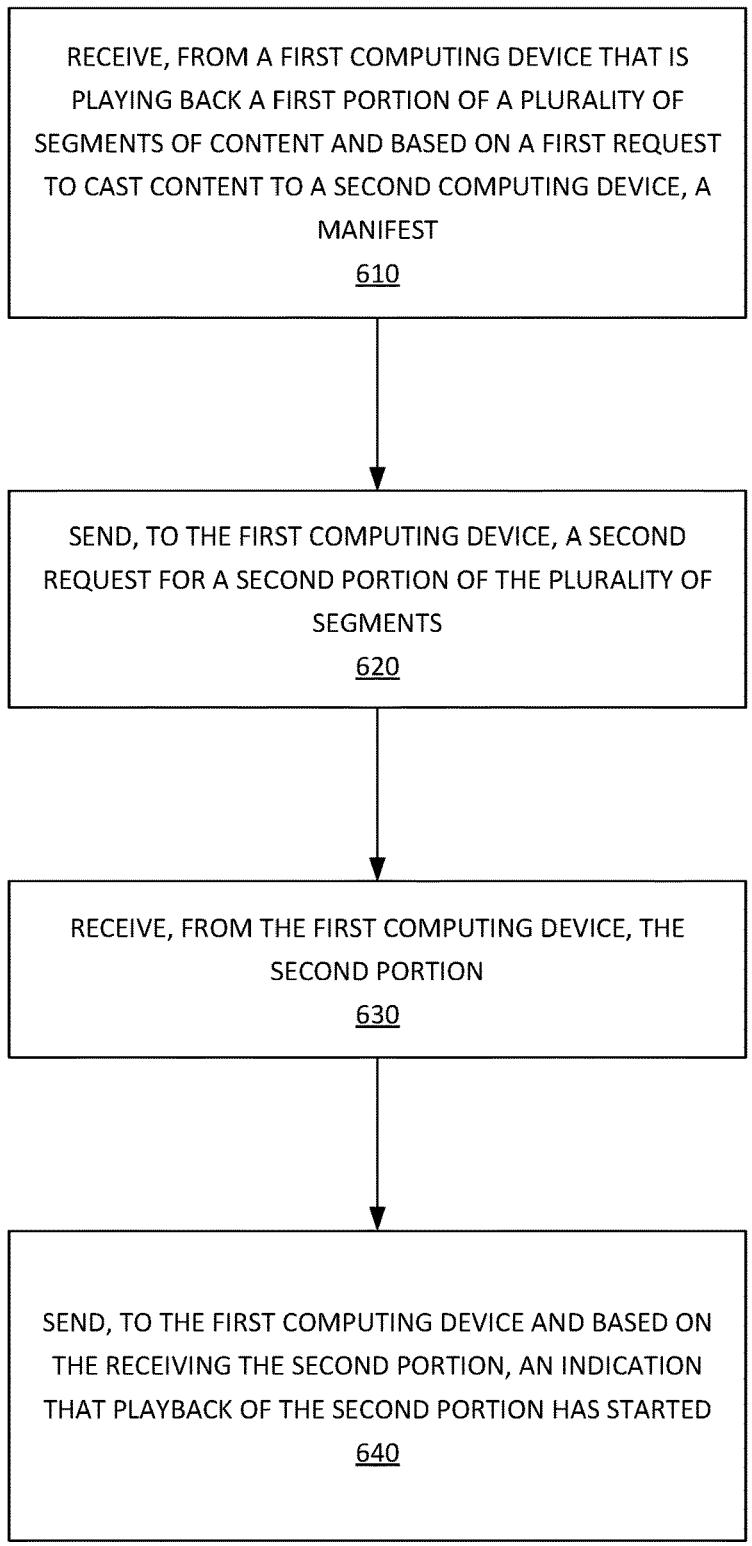
FIG. 6 shows an example method.

FIG. 6 shows an example method 600. The method 600 of FIG. 6, may be performed by any device, for example, by any of the devices depicted in FIGS. 1-4 or described herein. While each step in the method 600 of FIG. 6 is shown and described separately, multiple steps may be executed in a different order than what is shown, in parallel with each other, or concurrently with each other. At step 610, a manifest may be received from a first computing device that is playing back a first portion of a plurality of segments of content and based on a first request to cast content to a second computing device. The plurality of segments of content may have been received by the first computing device from the content origin. The first computing device may comprise a smartphone, a tablet, a wearable computing device, or a mobile computing device. The first request may be received via a user input. The second computing device may comprise a television, a monitor, a laptop, a desktop computer, or a set-top box.

The manifest may comprise instructions to request a second portion of a plurality of segments from the first computing device. The manifest may comprise the IP address of the first computing device indicating that the first computing device is a source of the second portion. The manifest may be sent to the second computing device based on a first request to cast the content to the second computing device.

At step 620, a second request for a second portion of the plurality of segments may be sent to the first computing device. The second request for the second portion may indicate a request for low resolution content. The second request may be based on the first request and the manifest. The first computing device may send an indication that the content is being casted to the second computing device to the content origin to cause the content origin to send a second plurality of segments of content to the second computing device once the first plurality of segments of content have been played back. The second plurality of content segments may comprise high resolution content.

At step 630, the second portion may be received from the first computing device. The first computing device may be running a web server that accepts requests for the second portion from the second computing device via a transfer protocol such as a transfer protocol used for OTT playout applications. For example, this protocol may be HTTP, or any other transfer protocol may be used. At step 640, the second computing device may send, to the first computing device an indication and based on the receiving the second portion, an indication that the second computing device started playback of the second portion. The first computing device may discontinue playback via the first computing device of the first portion based on the indication.

Figure 7:
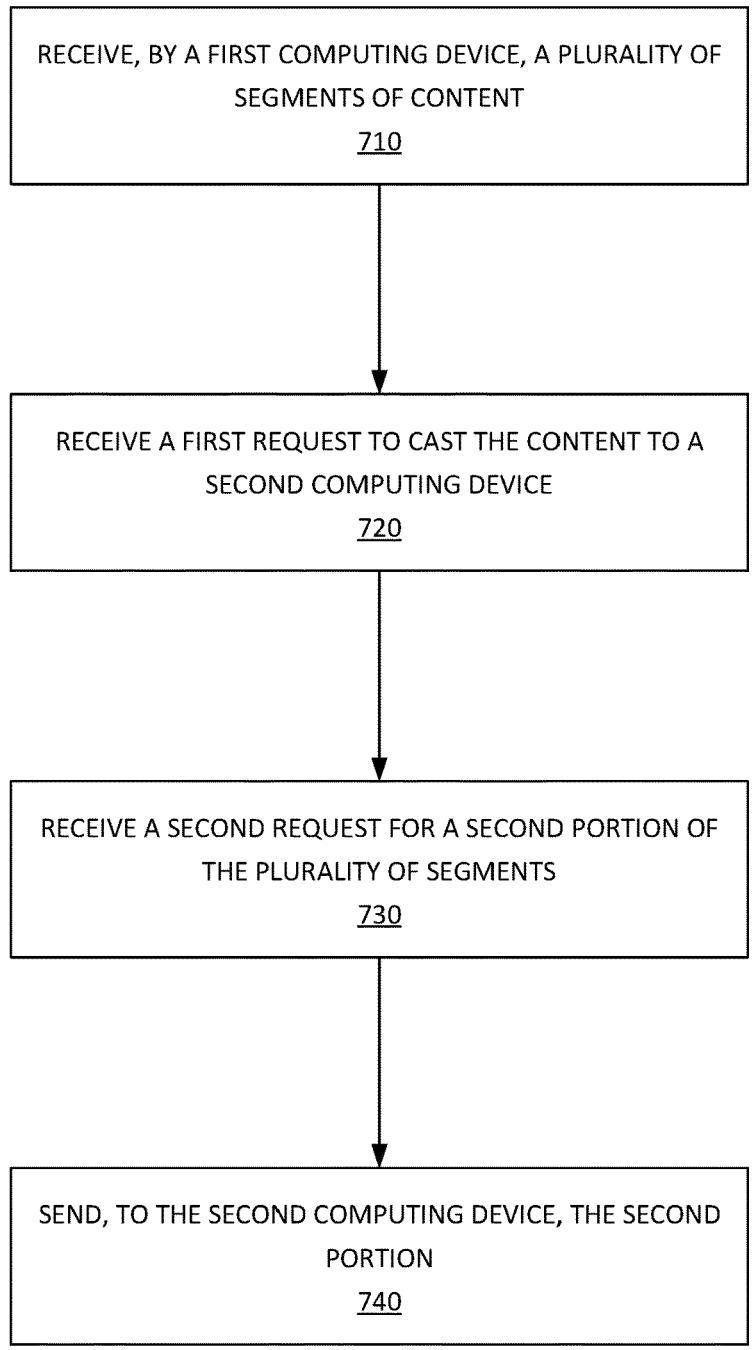
FIG. 7 shows an example method.

FIG. 7 shows an example method 700. The method 700 of FIG. 7, may be performed by any device, for example, by any of the devices depicted in FIGS. 1-4 or described herein. While each step in the method 700 of FIG. 7 is shown and described separately, multiple steps may be executed in a different order than what is shown, in parallel with each other, or concurrently with each other. At step 710, a plurality of segments of content may be received by a first computing device. The first computing device may comprise a smartphone, a tablet, a wearable computing device, or a mobile computing device. The first request may be received via a user input.

At step 720, a first request to cast the content to a second computing device may be received. The first request may be received during playback via the first computing device of a first portion of the plurality of segments of content. The second computing device may comprise a television, a monitor, a laptop, a desktop computer, or a set-top box.

At step 730, a second request for a second portion of the plurality of segments may be received from the second computing device. The second request may be based on the first request and a manifest comprising instructions to request the second portion from the first computing device. The manifest may comprise the IP address of the first computing device indicating that the first computing device is a source of the second portion. The second request for the second portion may request that the second portion be encoded at a lower resolution than the first portion. The manifest may be generated by the first computing device or by the content origin. The manifest may be sent to the second computing device in response to the first request to cast the content to the second computing device. The first computing device may send an indication that the content is being casted to the second computing device to the content origin to cause the content origin to send a second plurality of segments of content to the second computing device once the first plurality of segments of content have been played back. The second plurality of content segments may comprise high resolution content.

At step 740, the second portion may be sent to the second computing device. Sending the second portion may comprise running a web server that accepts requests for the second portion from the second computing device via a transfer protocol such as a transfer protocol used for OTT playout applications. For example, this protocol may be HTTP, or any other transfer protocol may be used. The first computing device may receive an indication from the second computing device and based on the sending the second portion that the second computing device started playback of the second portion. The first computing device may discontinue playback via the first computing device of the first portion based on the indication.

Figure 8:
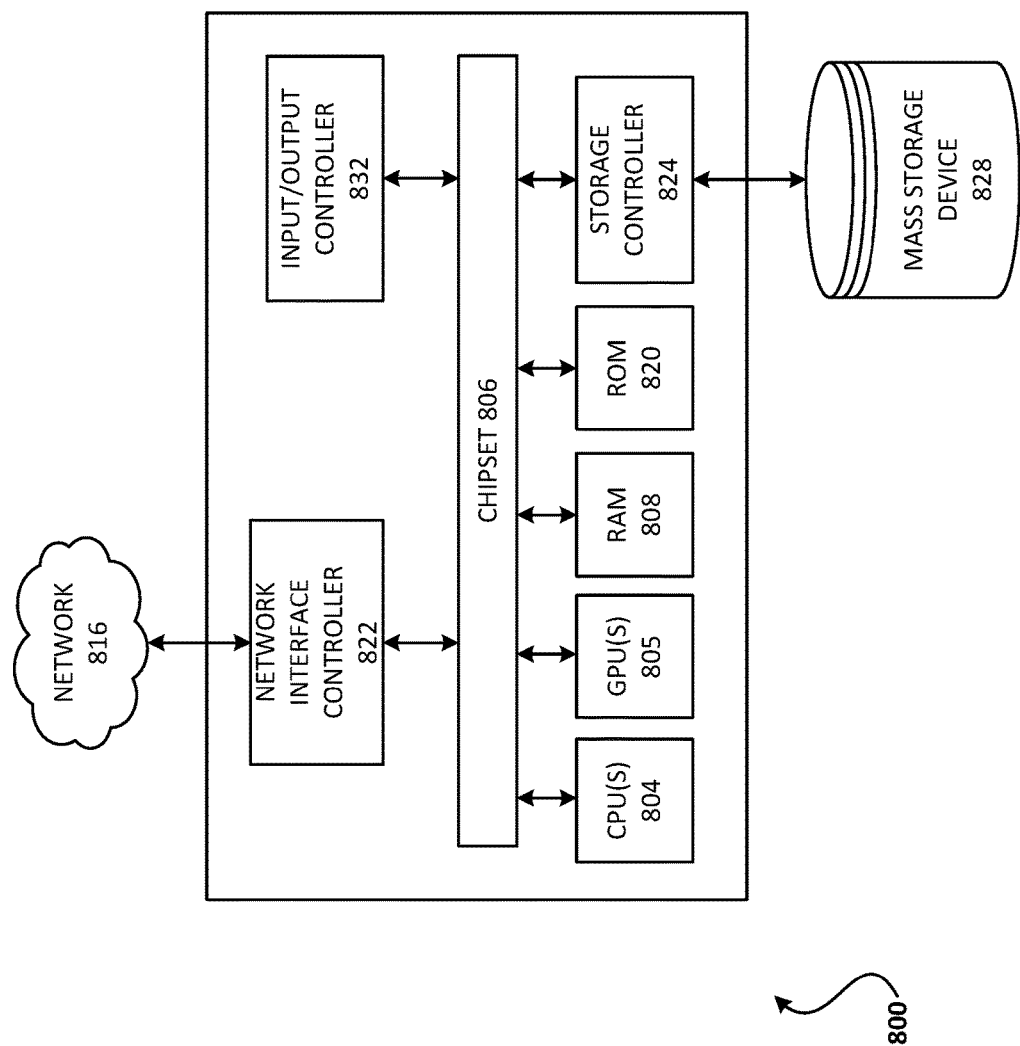
FIG. 8 shows an example computing device.

FIG. 8 depicts a computing device that may be used in various aspects, such as the servers, modules, and/or devices depicted in FIGS. 1-4. With regard to the example architecture of FIGS. 1-4, each device depicted in FIGS. 1-4 may be implemented in an instance of a computing device 800 of FIG. 8. The computer architecture shown in FIG. 8 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 1-7.

The computing device 800 may comprise a baseboard, or "motherboard," which is a printed circuit board to which a multitude of components or devices may be connected by way of a system bus or other electrical communication paths. One or more central processing units (CPUs) 804 may operate in conjunction with a chipset 806. The CPU(s) 804 may be standard programmable processors that perform arithmetic and logical operations necessary for the operation of the computing device 800.

The CPU(s) 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 804 may be augmented with or replaced by other processing units, such as GPU(s) 805. The GPU(s) 805 may comprise processing units specialized for but not necessarily limited to highly parallel computations, such as graphics and other visualization-related processing.

A chipset 806 may provide an interface between the CPU(s) 804 and the remainder of the components and devices on the baseboard. The chipset 806 may provide an interface to a random access memory (RAM) 808 used as the main memory in the computing device 800. The chipset 806 may provide an interface to a computer-readable storage medium, such as a read-only memory (ROM) 820 or non-volatile RAM (NVRAM) (not shown), for storing basic routines that may help to start up the computing device 800 and to transfer information between the various components and devices. ROM 820 or NVRAM may also store other software components necessary for the operation of the computing device 800 in accordance with the aspects described herein.

The computing device 800 may operate in a networked environment using logical connections to remote computing nodes and computer systems through local area network (LAN) 816. The chipset 806 may include functionality for providing network connectivity through a network interface controller (NIC) 822, such as a gigabit Ethernet adapter. A NIC 822 may be capable of connecting the computing device 800 to other computing nodes over a network 816. It should be appreciated that multiple NICs 822 may be present in the computing device 800, connecting the computing device to other types of networks and remote computer systems.

The computing device 800 may be connected to a mass storage device 828 that provides non-volatile storage for the computer. The mass storage device 828 may store system programs, application programs, other program modules, and data, which have been described in greater detail herein. The mass storage device 828 may be connected to the computing device 800 through a storage controller 824 connected to the chipset 806. The mass storage device 828 may consist of one or more physical storage units. A storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 800 may store data on a mass storage device 828 by transforming the physical state of the physical storage units to reflect the information being stored.

The specific transformation of a physical state may depend on various factors and on different implementations of this description. Examples of such factors may include, but are not limited to, the technology used to implement the physical storage units and whether the mass storage device 828 is characterized as primary or secondary storage and the like.

For example, the computing device 800 may store information to the mass storage device 828 by issuing instructions through a storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 800 may read information from the mass storage device 828 by detecting the physical states or characteristics of one or more particular locations within the physical storage units.

In addition to the mass storage device 828 described herein, the computing device 800 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 800.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 828 depicted in FIG. 8, may store an operating system utilized to control the operation of the computing device 800. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 828 may store other system or application programs and data utilized by the computing device 800.

The mass storage device 828 or other computer-readable storage media may also be encoded with computer-executable instructions, which, when loaded into the computing device 800, transforms the computing device from a general-purpose computing system into a special-purpose computer capable of implementing the aspects described herein. These computer-executable instructions transform the computing device 800 by specifying how the CPU(s) 804 transition between states, as described herein. The computing device 800 may have access to computer-readable storage media storing computer-executable instructions, which, when executed by the computing device 800, may perform the methods described in relation to FIGS. 1-7.

A computing device, such as the computing device 800 depicted in FIG. 8, may also include an input/output controller 832 for receiving and processing input from a number of input devices, such as a keyboard, a mouse, a touchpad, a touch screen, an electronic stylus, or other type of input device. Similarly, an input/output controller 832 may provide output to a display, such as a computer monitor, a flat-panel display, a digital projector, a printer, a plotter, or other type of output device. It will be appreciated that the computing device 800 may not include all of the components shown in FIG. 8, may include other components that are not explicitly shown in FIG. 8, or may utilize an architecture completely different than that shown in FIG. 8.

As described herein, a computing device may be a physical computing device, such as the computing device 800 of FIG. 8. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes¬ from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   receiving, by a first computing device, from a content source, a plurality of segments of content;
   receiving, via the first computing device, during playback of a first portion of the plurality of segments of content, a first request to cast the content to a second computing device;
   generating and sending, by the first computing device and based on the first request to cast the content, to the second computing device, a manifest comprising instructions for the second computing device to request a second portion of the plurality of segments of content from the first computing device and further request subsequent portions of the plurality of segments of content from the content source;
   receiving, by the first computing device, from the second computing device, a second request for the second portion of the plurality of segments of content based on the manifest; and
   sending, by the first computing device, to the second computing device, the second portion.

2. The method of claim 1, wherein the manifest comprises an Internet Protocol (IP) address of the first computing device indicating that the first computing device is a source of the second portion.

3. The method of claim 1, further comprising:
   receiving, by the first computing device, from the second computing device and based on the sending the second portion, a signal indicating playback of at least part of the second portion at the second computing device that corresponds to playback of at least part of the first portion at the first computing device; and
   discontinuing, based on the signal, playback of the first portion at the first computing device.

4. The method of claim 1, wherein the sending, to the second computing device, the second portion comprises:
   running a web server that accepts requests for the second portion from the second computing device via Hypertext Transfer Protocol (HTTP).

5. The method of claim 1, further comprising:
   sending, to the content source and based on the first request, an indication that the content is being casted to the second computing device to cause the content source to send one or more of the subsequent portions of the plurality of segments of content to the second computing device.

6. A method comprising:
   receiving, from a first computing device that is playing back a first portion of a plurality of segments of content received from a content source, a manifest generated and sent by the first computing device based on a first request to cast content to a second computing device, wherein the manifest comprises instructions for the second computing device to request a second portion of the plurality of segments of content from the first computing device and further request subsequent portions of the plurality of segments of content from the content source;
   sending, to the first computing device, a second request for the second portion of the plurality of segments of content;
   receiving, from the first computing device, the second portion; and
   sending, to the first computing device and based on the receiving the second portion, an indication that playback of the second portion has started to cause the first computing device to discontinue playback of the first portion.

7. The method of claim 6, wherein the manifest comprises an Internet Protocol (IP) address of the first computing device indicating that the first computing device is a source of the second portion.

8. The method of claim 6, wherein the first computing device is running a web server that accepts requests for the second portion from the second computing device via Hypertext Transfer Protocol (HTTP).

9. The method of claim 6, wherein the first computing device or the second computing device comprises at least one of: a smartphone, a tablet, a wearable computing device, a mobile computing device, a television, a monitor, a laptop, a desktop computer, or a set-top box.

10. The method of claim 6, wherein the first portion is encoded at a first resolution, wherein the second request to the first computing device indicates a request for the second portion encoded at a second resolution that is less than the first resolution, wherein the indication further indicates that playback of at least part of the second portion corresponds to playback of at least part of the first portion at the first computing device.

11. A method comprising:
receiving, by a first computing device, from a content source, a plurality of segments of content;
receiving, via the first computing device, during playback of a first portion of the plurality of segments of content, a first request to cast the content to a second computing device;
generating and sending, by the first computing device, to the second computing device, a manifest, generated by the first computing device based on the first request, comprising instructions to request a second portion of the plurality of segments of content from the first computing device and further request subsequent portions of the plurality of segments of content from the content source;
receiving, from the second computing device, and based on the first request and the manifest, a second request for the second portion of the plurality of segments of content; and
sending, to the second computing device, the second portion.

12. The method of claim 11, wherein the manifest comprises an Internet Protocol (IP) address of the first computing device indicating that the first computing device is a source of the second portion.

13. The method of claim 11, further comprising:
receiving, by the first computing device, from the second computing device and based on the sending the second portion, a signal indicating playback of at least part of the second portion at the second computing device that corresponds to playback of at least part of the first portion at the first computing device; and
discontinuing, based on the signal, playback of the first portion at the first computing device.

14. The method of claim 11, further comprising:
generating, by the first computing device and based on the first request, the manifest; and
sending, to the second computing device, the manifest.

15. The method of claim 11, further comprising:
receiving, from a content origin, the manifest; and
sending, to the second computing device, the manifest.

16. The method of claim 11, wherein the sending, to the second computing device, the second portion comprises:
running a web server that accepts requests for the second portion from the second computing device via Hypertext Transfer Protocol (HTTP).

17. The method of claim 11, further comprising:
sending, to the content source and based on the first request, an indication that the content is being casted to the second computing device to cause the content source to send a second plurality of segments of content to the second computing device.

18. The method of claim 11, wherein the second request for the second portion includes a request for the second portion be encoded at a lower resolution than the first portion.

19. The method of claim 11, wherein the first computing device or the second computing device comprises at least one of: a smartphone, a tablet, a wearable computing device, a mobile computing device, a television, a monitor, a laptop, a desktop computer, or a set-top box.

20. The method of claim 11, wherein casting the content to the second computing device comprises sending the playback of content from the first computing device to the second computing device.

* * * * *